March 25, 1924.
M. BELLOWS
INSECT EXTERMINATING DEVICE
Filed April 18, 1923
1,488,145
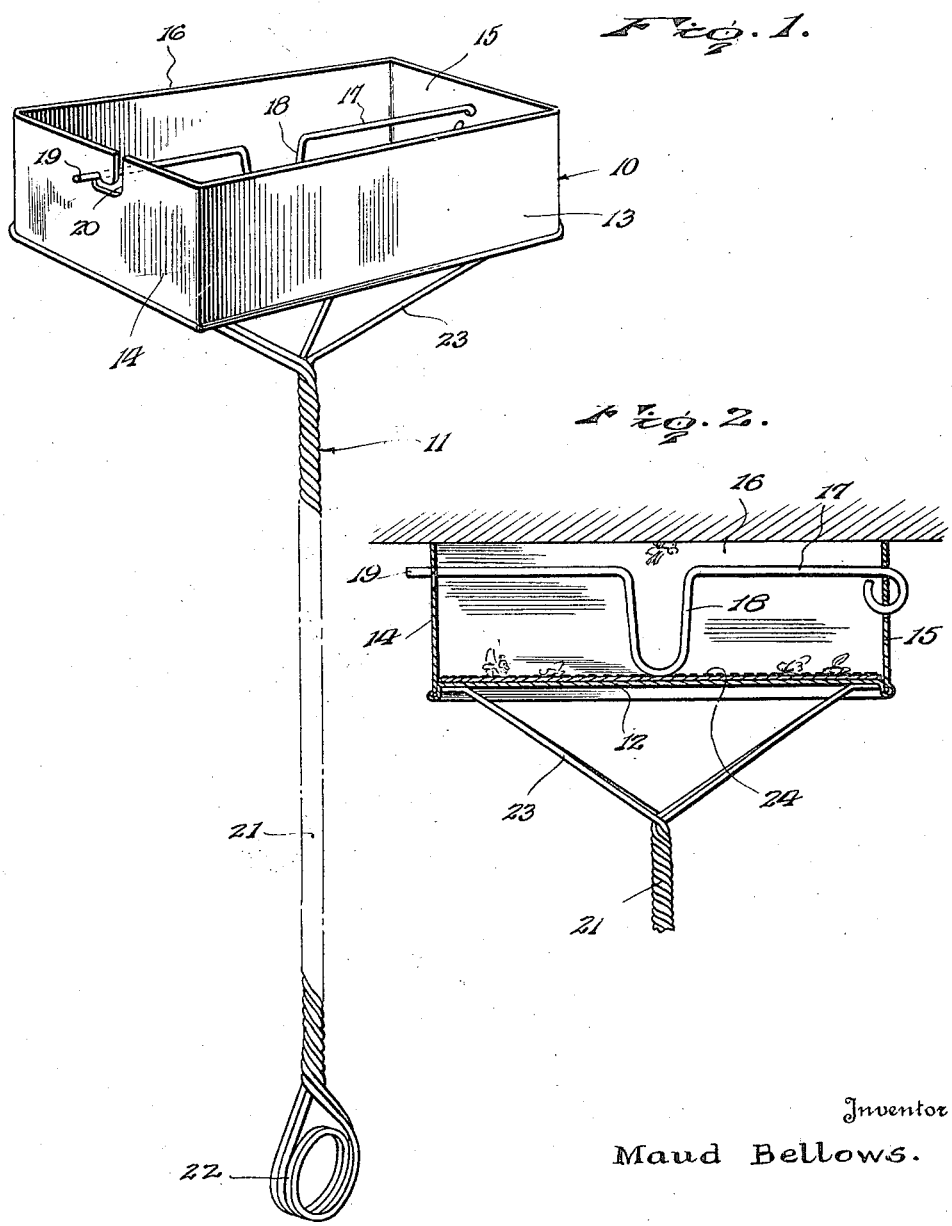
Inventor
Maud Bellows.
By *Lacy & Lacy*, Attorneys Patented Mar. 25, 1924.

1,488,145

UNITED STATES PATENT OFFICE.

MAUD BELLOWS, OF SPIRIT LAKE, IOWA.

INSECT-EXTERMINATING DEVICE.

Application filed April 18, 1923. Serial No. 632,939.

*To all whom it may concern:*

Be it known that I, MAUD BELLOWS, a citizen of the United States, residing at Spirit Lake, in the county of Dickinson and State of Iowa, have invented certain new and useful Improvements in Insect-Exterminating Devices, of which the following is a specification.

My invention relates to a device for catching flies without ruining the wallpaper, the ceiling or the carpets in the room where the flies usually gather. The usual method of getting rid of flies is to use a swatter with a short handle, but this method has the disadvantage of soiling the wallpaper and dropping flies on the floor to be swept up later on.

Another way of catching flies is by use of so-called "tanglefoot" paper deposited in different places in the room, in which case you have to trust to the fly being attracted towards the paper. This is not a sure way of ridding the room of flies, which have a tendency to collect on windows and ceiling of the room.

The main object of the present invention is now to provide a sure means of catching the flies without soiling the walls, ceiling or furniture, and to go after the fly instead of depending on the fly coming to a flypaper.

In the accompanying drawing one embodiment of the invention is illustrated, and:

Figure 1 shows a perspective view of the insect exterminating device; and

Figure 2 is a fragmentary vertical section thereof.

The device consists of an upper box-shaped structure 10, which may be called the trap, and a handle 11 rigidly secured on the under side thereof. The trap has a solid bottom 12, and two longitudinal walls 13 and two end walls 14 and 15. This box-shaped trap may be made of tin plate pressed to form the bottom and walls as integral parts, or the walls might be soldered or welded to the bottom. The top edges 16 of the walls should be straight and on the same level.

In the end wall 15 is secured a retaining lever 17 which is of flexible material such as spring wire, and has a downwardly directed hump 18 in the middle extending to the bottom 12 and pressing against the same when the free end 19 of the lever engages in the L-shaped slot 20 in the end wall 14.

A suitable size for this box or trap is three inches wide, six inches long and one inch deep, but it is evident that any other dimensions or shape, as, for instance, round, square or oblong may be given to the trap.

The handle 11 is preferably constructed of wire, several strands of which being twisted around to form the stem 21, which is preferably provided with a loop 22 at the lower end. At the opposite end of the handle, the wires are divided out to run to each corner of the box to form arms 23 secured on the under side of the trap, as by soldering or in any other suitable manner. The length of the handle is about forty inches, but may be made longer in case the rooms, where the trap is going to be used, are very high. In the bottom of the box or trap is placed a piece of flypaper 24, preferably of the kind generally known under the name of "tanglefoot" and this piece of flypaper is held in position by the lever 17, the hump 18 of which presses against the flypaper.

In using this device, the handle 11 is gripped near its loop 22, and the open side of the trap 10 is placed against the wall or the ceiling where the flies are seated. This action will disturb the fly, which tries to escape and, by doing so, is liable to hit the flypaper and be caught by the same. This procedure is repeated until the room is rid of flies, and whenever the sheet of paper 24 has been filled, a new piece is put in its place. This is easily accomplished by detaching the free end 19 of the lever 17, and lifting the same sufficiently to remove the flypaper, when a new piece is put in its place and held in position as before by locking the lever 17 in the L-shaped slot 20.

Instead of using tin or sheet metal in constructing the trap 10, any other suitable material may be utilized such as cardboard, celluloid, fiber and the like.

This device is extremely sanitary as the flies will be collected in the trap itself and not strewn around the floor and furniture or falling into dishes of food or beverages, as is often the case when a swatter is used, and whenever a sheet of flypaper is taken out from the trap, it should immediately be burned or destroyed in any other manner.

It is also clear that by the use of this device considerable time is gained in ridding a room of the pest, as instead of waiting the fly's pleasure in approaching a flypaper deposited in the room, he is hunted to his hiding place and caught in the trap.

Having thus described the invention what is claimed as new is:

1. An insect exterminator comprising a box member open at one end and adapted to receive flypaper in its bottom, and means for retaining the flypaper in position, said means including a lever hinged in one of the walls of said box member and engaging in an L-shaped slot provided in the opposite wall of said box member.

2. An insect exterminator comprising a box member open at one end and adapted to receive flypaper in its bottom, and means for retaining the flypaper in position, said means including a lever hinged in one of the walls of said box member and engaging in an L-shaped slot provided in the opposite wall of said box member, said lever having a hump adapted to contact with the flypaper.

3. An insect exterminator comprising a box member open at one end and adapted to receive flypaper in its bottom, means for retaining the flypaper in position including a lever engaging in the walls of the box member and provided with a bent portion contacting with the flypaper, and a handle attached to said box member on the bottom portion thereof.

In testimony whereof I affix my signature.

MAUD BELLOWS. [L. S.]